R. KELLY.
EYEGLASS HOLDER.
APPLICATION FILED APR. 18, 1921.

1,438,532.

Patented Dec. 12, 1922.

WITNESSES:

INVENTOR
Raymond Kelly,
By Emmuel N. Pond,
ATTORNEY.

Patented Dec. 12, 1922.

1,438,532

UNITED STATES PATENT OFFICE.

RAYMOND KELLY, OF CHICAGO, ILLINOIS, ASSIGNOR TO SAMUEL F. JOOR, OF CHICAGO, ILLINOIS.

EYEGLASS HOLDER.

Application filed April 18, 1921. Serial No. 462,415.

*To all whom it may concern:*

Be it known that I, RAYMOND KELLY, a citizen of the United States, residing at Chicago, in the county of Cook and State of Illinois, have invented certain new and useful Improvements in Eyeglass Holders, of which the following is a specification.

This invention relates to eye glass holders, and has reference more particularly to temporary attachments of the side bows and nose pieces to the lenses, permitting the removal of the side bows or the nose piece by compression of a spring device which grips the glass lens firmly enough to hold it in position without the screws through the lenses which are now used, or which will reach over the edge of a shell, gold, or other rim-mounted lens, and hold same without being mechanically attached to the frames.

The application of this invention makes it possible for the wearer to substitute a new lens for one broken or scratched without the use of tools; and more especially provides a convenient means for the addition of side bows to nose mounted eye glasses when the wearer is to be exposed to wind, as in motoring, playing golf, etc.

I am aware that many forms of spring nose pieces have been made, and many forms of side bows, but the novelty rests in the attachment of these to the lenses by the spring clips more fully described below, and shown in the drawing:

An embodiment of my invention is illustrated in the accompanying drawing, in which.

Figure 2:
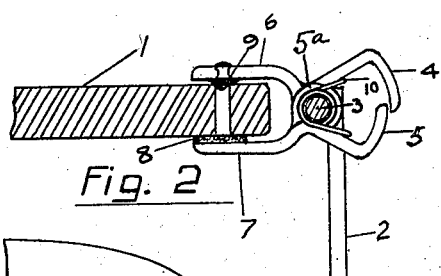
Fig. 2 is a plan and partial section of the same part of the spectacles.
Figure 3:
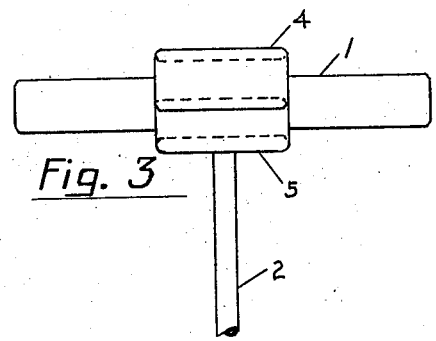
Fig. 3 is an end elevation of the same parts, viewed from the right of Fig. 2.
Figure 1:
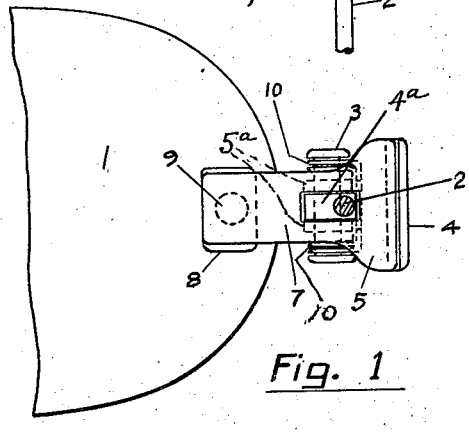
Fig. 1 is a rear view of part of a spectacle lens showing the spring clip in inner side elevation and with the side bow in section.

It is obvious that many variations are possible to accomplish the result of clamping the glass lens between two clip fingers, and the drawings illustrate a typical structure which I shall treat with a variety of changes, but in all the action is identical.

1 designates the spectacle or eye glass lens, and 2 designates a side bow mounted in an eye 4ª, which latter is mounted centrally on a pivot pin 3 and constitutes the hinge member of one of the clip members hereinafter referred to. Hinged on this pivot pin by the eye 4ª and a pair of eyes 5ª straddling the latter are a pair of levers having outer pinch handles 4 and 5 and inner lens clamping arms or fingers 6 and 7. In the finger 6 is mounted a small rubber half-sphere 9, and on the cooperating finger 7 is a flat pad 8, of a cork or fibrous material saturated with some adhesive material, such as rubber cement, which gives a considerable degree of adhesion to the glass, and permits the removal of the pad and the entire clip from the glass without injury to any part when the clamping pressure is released. To obtain sufficient pressure to securely hold the glass, a pair of wire springs 10 are coiled around the pivot pin 3, with their inner ends anchored to the latter and their outer free ends pressing the outer pinch handle 4 and 5 apart. With this construction the outer pinch handles 4 and 5 may be readily squeezed together by the thumb and fore-finger of the user's hand, thereby causing the clamping finger 6 to rise off the glass, releasing the pressure on the flat pad 8, after which the glass is readily freed from the pad 8 and the clip.

The re-attachment of the bow to the lens involves the reverse operation. The pinch handles 4 and 5 are squeezed together, thereby opening the clamping fingers 6 and 7, after which the lens 1 is placed in the proper relative position; and, on releasing the pinch handles 4 and 5, the springs 10 rotate the levers on the pin 3 and thereby cause the fingers 6 and 7 to exert a clamping pressure through the pads 8 and 9 on the glass sufficient to firmly hold the glass and resist all ordinary separation stresses.

Figure 4:
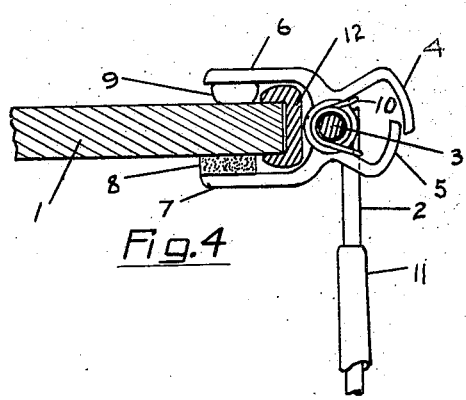
Fig. 4 is a view similar to Fig. 2, illustrating the application of the clip to lenses set in surrounding frames of shell, metal or other such materials.

In Fig. 4 I have illustrated the same detachable lens holding structure applied to an eye glass lens having a rim or mounting 12, the only variation in the structure of the clip being a slightly greater spread of the clamping fingers 6 and 7 to straddle the rim 12, and a slightly greater thickness of the pads 8 and 9. In this construction I have shown the bow 2 as provided with a composition covering 11 to match the rim mounting 12.

Figure 5:
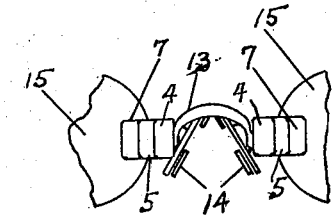
Fig. 5 is a front elevation, illustrating the application of the spring clips to the central bow holding both lenses, the bow part and the clips holding the nose being of any of the approved types with the spring clips added thereto.

In Fig. 5 I have somewhat conventionally illustrated an application of this same clip to detachably connect the nose spring or bow to the inner adjacent edges of the lenses. In this view, 13 designates the nose spring and 14 the nose clips which may be of any ordinary and usual construction. 15 designates the lenses, and the pinch handles 4 and 5 and clamping finger 7 of the pair of clips are also shown, it being understood that the clip levers are pivoted on a fulcrum pin similar to 3, to which pin the ends of the nose spring 13 are attached.

I claim:

1. An eye glass holder, comprising a bow, and a lens holding clip mounted on said bow, said clip including a pair of pivoted spring-pressed fingers adapted to clampingly engage an edge of the lens, and means for separating said fingers to release the lens.

2. An eye glass holder, comprising a bow, and a lens holding clip mounted on said bow, said clip including a pair of pivoted spring-pressed fingers adapted to clampingly engage an edge of the lens, and a pair of arms rigid with said fingers and adapted to be compressed to release the latter from the lens.

3. An eye glass holder, comprising a bow, a pivot pin to which one end of said bow is connected, a pair of levers mounted on said pivot pin, the inner arms of said levers constituting pinch fingers to clamp a lens and their outer arms adapted to be pressed together to open said fingers, and a spring acting to hold said fingers in lens gripping position.

RAYMOND KELLY.